US008555318B2

(12) United States Patent
Whitehead

(10) Patent No.: US 8,555,318 B2
(45) Date of Patent: Oct. 8, 2013

(54) CUSTOMIZED MEDIA ON DEMAND

(75) Inventor: Steven D. Whitehead, Hudson, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 663 days.

(21) Appl. No.: 11/567,530

(22) Filed: Dec. 6, 2006

(65) Prior Publication Data

US 2008/0141307 A1 Jun. 12, 2008

(51) Int. Cl.
*G06F 3/00* (2006.01)

(52) U.S. Cl.
USPC ..................... 725/46; 725/9; 725/44

(58) Field of Classification Search
None
See application file for complete search history.

(56) References Cited

U.S. PATENT DOCUMENTS

| | | | |
|---|---|---|---|
| 6,088,722 A * | 7/2000 | Herz et al. ............. | 709/217 |
| 6,240,555 B1 * | 5/2001 | Shoff et al. ............ | 725/110 |
| 6,389,467 B1 | 5/2002 | Eyal | |
| 6,601,237 B1 * | 7/2003 | Ten Kate et al. ............. | 725/47 |
| 6,772,147 B2 * | 8/2004 | Wang ................. | 707/3 |
| 7,228,305 B1 * | 6/2007 | Eyal et al. .............. | 707/100 |
| 2001/0043795 A1 * | 11/2001 | Wood et al. ............ | 386/69 |
| 2002/0129375 A1 * | 9/2002 | Kim et al. ............. | 725/100 |
| 2003/0172378 A1 * | 9/2003 | Lalitha et al. ........... | 725/34 |
| 2004/0117828 A1 * | 6/2004 | Parker et al. ........... | 725/46 |
| 2006/0174269 A1 * | 8/2006 | Hansen-Turton ......... | 725/39 |
| 2006/0248570 A1 | 11/2006 | Witwer | |
| 2007/0124769 A1 * | 5/2007 | Casey et al. ............ | 725/46 |
| 2007/0157260 A1 * | 7/2007 | Walker ................ | 725/86 |
| 2007/0204292 A1 * | 8/2007 | Riedl et al. ............ | 725/34 |

FOREIGN PATENT DOCUMENTS

| | | |
|---|---|---|
| CN | 1298602 | 6/2001 |
| CN | 1640133 | 7/2005 |

* cited by examiner

*Primary Examiner* — Hai V Tran
*Assistant Examiner* — Rong Le

(57) ABSTRACT

A profile includes an indication of one or more topics of interest. A mixing server is configured to create a custom media channel based on the profile. A playback application is configured to provide the custom media channel upon a request from a user, wherein the custom media channel includes more than one item of multimedia content.

19 Claims, 6 Drawing Sheets

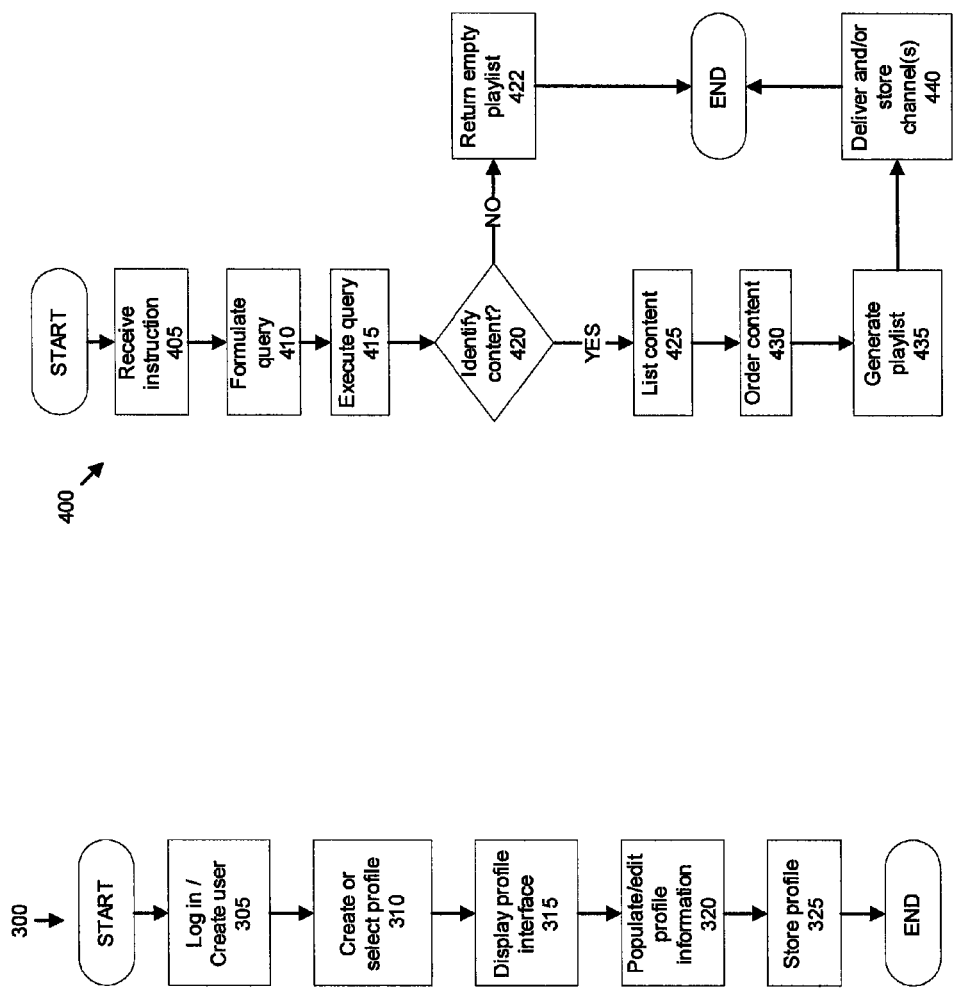

CUSTOMIZED MEDIA ON DEMAND

BACKGROUND INFORMATION

Current multimedia programming such as video programming generally requires users to manually select content of interest. For example, a number of sites exist on the World Wide Web for providing video clips and the like. However, these sites generally require users to select videos for playback one by one. Thus, a user must manually locate a video of interest, select the video for playback, play it, and then repeat the process to play other videos. Accordingly, present mechanisms for presenting aggregated multimedia content such as video content generally do not present the aggregated content in a continuous stream. Further, users are generally limited to accessing such multimedia content via traditional computing devices (e.g., personal computers) connected to the Internet, and cannot access the multimedia content via television sets or the like.

In addition to video or multimedia aggregation websites, numerous sources presently exist for multimedia content such as video content. For example, video is presently broadcast into many homes on tens if not hundreds of channels. Generally not all of the content even on a single channel is of interest to a user, and certainly not all of the channels available are likely to be of interest to the user. Video on demand (VOD) is available to some subscribers to video services, but present VOD services generally allow users to select and view items of multimedia content, e.g., a movie, sporting event, etc, one at a time. Such items are generally at least thirty minutes long. Further, other than using a program guide such as an interactive program guide, a printed program guide, etc., users presently have no way of locating and viewing video content of interest other than by performing a manual search. Moreover, present program guides generally are generic and display a predetermined set of broadcast or video-on-demand programming available to a user, where users have a limited ability, if any, to customize the program guide.

In short, present mechanisms for presenting aggregated multimedia content such as video content do not filter or arrange multimedia content so as to present particular multimedia content of interest to the user upon the user's demand. Further, present mechanisms for presenting aggregated multimedia content do not allow a user to make a single request that returns a plurality of multimedia items without forcing the user to select the multimedia items one by one for viewing or listening.

BRIEF DESCRIPTION OF THE DRAWINGS

FIG. 3 illustrates an exemplary process for creating a profile for a custom media channel.

FIG. 4 illustrates an exemplary process for instantiating a custom media channel.

DETAILED DESCRIPTION OF PREFERRED EMBODIMENTS

Figure 1:
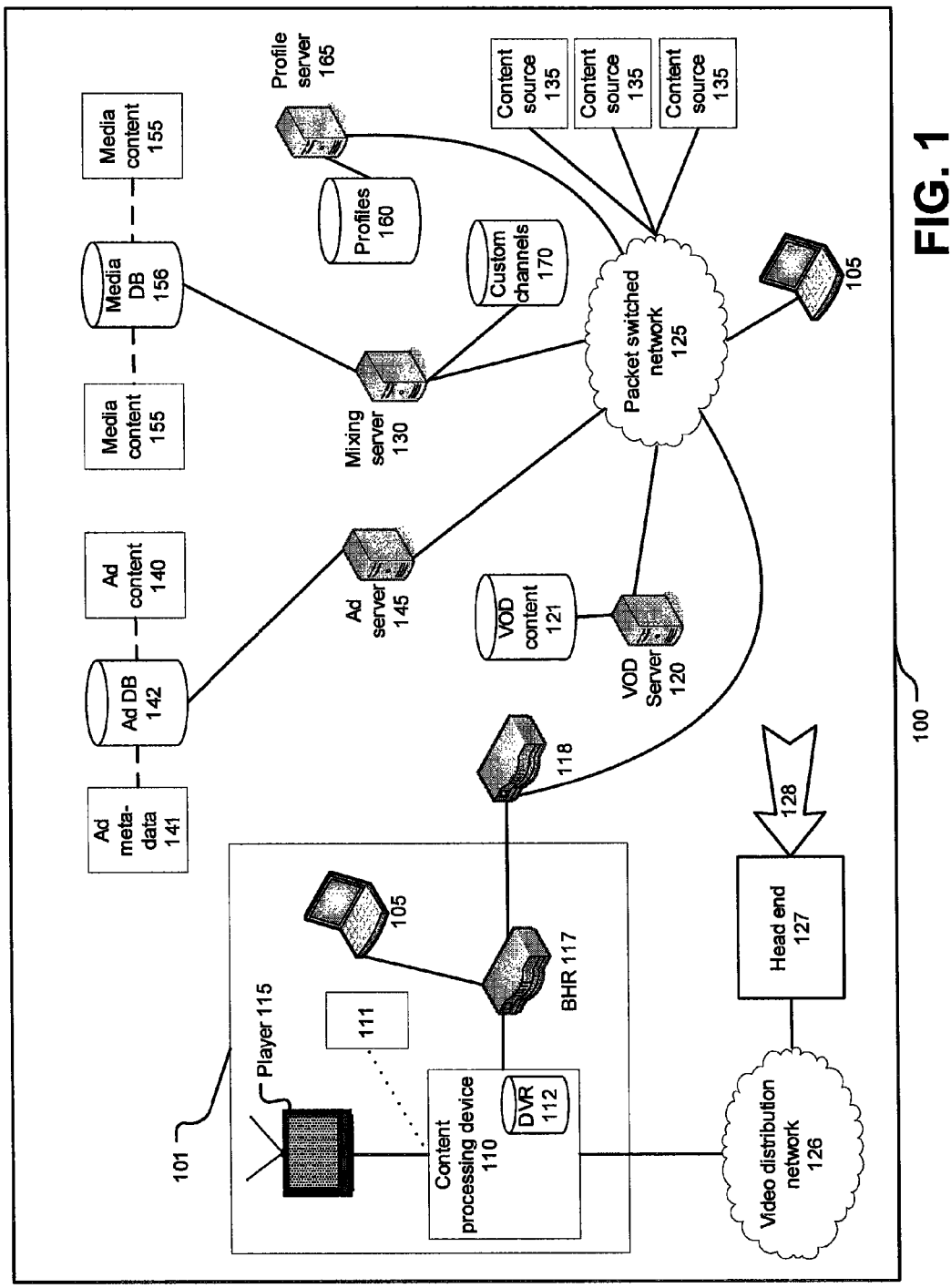
FIG. 1 illustrates an exemplary system for delivering video.

FIG. 1 illustrates an exemplary system 100 for delivering a video signal 128 and for displaying information and supporting custom media channels 170.

As illustrated in FIG. 1, a customer premise 101 includes a content processing device 110, which may be controlled by a user through a control 111. Content processing device 110 provides video or other multimedia to a user on a media player 115, e.g., a television set or video monitor. Content processing device 110 may be a set top box (STB) or similar device known for receiving a video signal from a network and for providing programming such as video to media player 115. A digital video recorder (DVR) 112 may be included in or attached to content processing device 110.

One or more computers 105 may be in communication with content processing device 110. As illustrated in FIG. 1, customer premise 101 may include computer 105, which may communicate with content processing device 110 through a network or router within customer premise 101 such as broadband home router 117. Further, a computer 105 may communicate with content processing device 110 via packet switched network 125, to which broadband home router 117 is connected. As described further below, computer 105 may include program instructions for providing a user interface through which a user may submit information concerning media of interest, and for submitting such information to a mixing server 130 and/or a profile server 165 to be stored in a custom channel profile 160.

Control 111 is generally a remote control that selectively communicates with content processing device 110 through known wireless communications, such as infrared (IR) or radio frequency (RF) communications. Control 111 generally includes numeric keys for selecting channels of media, e.g., video programming, as well as other keys for making selections and request according to menus provided on media player 115, in addition to arrow keys and the like for changing channels, changing volume, etc.

DVR 112 is generally known for storing video files, and may be used to store other kinds of multimedia files, such as audio files, image files, etc. As should be apparent, DVR 112 includes a computer-readable medium for storing digital data, including computer executable instructions and custom media channels 170, which are discussed further below, including with reference to FIG. 2. Video files stored on DVR 112 may be in any one of a variety of known formats, such as MPEG-2 or MPEG-4, promulgated by the Motion Picture Experts Group. Further, DVR 112 may include a known coder/decoder (codec) for decoding a custom media channel 170 for playback.

Media player 115 may be a television receiver such as is known, including a conventional television or a high definition television (HDTV). However, media player 115 may alternatively or additionally include software stored and executed on computer 105, such as Windows Media Player from Microsoft Corporation of Redmond, Wash., QuickTime from Apple Computer, Inc., of Cupertino, Calif., or RealPlayer from Real Networks, Inc. of Seattle, Wash., etc.

Content processing device 110 selectively communicates, e.g., via a broadband home router (BHR) 117, with a gateway router 118 to send information to, and receive information from, a packet switched network 125. Content processing device 110 generally performs and/or coordinates operations associated with receiving, decoding, storing, and displaying multimedia content 150. Device 110 also performs operations related to generating a user interface, e.g., that is displayed in media player 115, and responding to and processing user inputs, e.g., that are provided via control 111. As mentioned above, content processing device 110 may be a set top box (STB). However, operations performed by content processing device 110 may also or may alternatively be embedded in a sufficiently configured general purpose computing platform such as a personal computer, e.g., computer device 105.

A video distribution network 126 is a network for providing a video signal 128 such as is known. For example, network 126 may include hardware and software for providing video signal 128 via coaxial cable and/or fiber optic cable. As is known, video signal 128 is generally provided to a video distribution network 126 from a head end 127.

Packet switched network 125 is generally an internet protocol (IP) network. As such, network 125 uses known protocols for transporting data, such as user datagram protocol (UDP), transport control protocol (TCP), hypertext transfer protocol (HTTP), etc. Further, network 125 may include a variety of networks such as a wide area network (WAN), e.g., the Internet, a local area network (LAN), etc. As is known, packet switched network 125 may be used to transport a variety of data, including multimedia data such as audio and video. Accordingly, it is to be understood that embodiments are possible in which networks 125 and 126 are in fact combined into a single network, or in which video distribution network 126 is simply omitted, whereby packet switched network 125 is used to provide video signal 128 to content processing device 110.

BHR 117 is known for distributing audio, video, and data to devices within customer premises 101 such as content processing device 110. For example, in one embodiment, BHR 117 is the broadband home router or wireless broadband home router from Actiontec Electronics, Inc. of Sunnyvale, Calif. It should be understood BHR 117 may be provided by other companies. Further, it should be understood that BHR 117 is not always necessary for connecting content processing device 110 to network 125, e.g., a cable modem, DSL modem, or the like may be used alone or in combination with other network equipment.

Gateway router 118 is known for routing data packets in packet switched network 125. Gateway router 118 allows content processing device 110 to access packet switched network 125. By communicating with router 118, BHR 117 is able to obtain a network address such as an internet protocol (IP) address, thereby allowing content processing device 110, generally using Dynamic Host Configuration Protocol (DHCP), to in turn obtain a network address, e.g., an IP address, from BHR 117. Content processing device 110 may accordingly make requests to, and to receive data from, servers 120, 130, etc. via network 125 accessed through BHR 117 and router 118.

A video on demand (VOD) server 120 selectively communicates with content processing device 110 via network 125 and/or router 118. VOD server 120 represents known combinations of hardware and/or software used to provide video-on-demand. Video to be provided on demand by VOD server 120 is stored as a VOD content 121 within VOD server 120 or a related database.

In general, a user of content processing device 110, generally using control 111, may browse a menu of video-on-demand options displayed on media player 115. Upon the user making a selection of VOD content 121, content processing device 110 makes a request to VOD server 120 for the VOD content 121. Using known signaling protocols, VOD content 121 is provided to content processing device 110, and displayed to the user on media player 115. Such known signaling protocols generally support various actions by the users such as pause, rewind, stop, etc. For example, to process user commands and to communicate with VOD server 120, content processing device 110 may include instructions for establishing a control channel with VOD server 121 according to Real Time Streaming Protocol (RTSP), described in H. Schulzrinne, RFC 2326—Real Time Streaming Protocol (RTSP) (April 1998), published by the Internet Society of Reston, Va. and available on the world wide web at the faqs.org website.

A mixing server 130 also selectively communicates with content processing device 110 via network 125 and/or router 118. Mixing server 130 may also selectively communicate with VOD server 120, generally through network 125, although it is to be understood that other communications links are possible, or that servers 120 and 130 could even be located on the same hardware or even integrated into a single combined server. A basic purpose of the mixing server 130 is to assemble and deliver to content processing device 110 one or more custom media channels 170. Mixing server 130 provides one or more custom media channels 170 to content processing device 110, and thereby provides functionality similar to VOD server 120, and in fact, embodiments are possible in which mixing server 130 and VOD server 120 are combined. In any event, content processing device 110 may include instructions for establishing a control channel with mixing server 130 using RTSP.

Further, mixing server 130 provides additional functionality for combining advertising content 140 and/or media content 155 to create custom media channels 170, and to deliver custom media channels 170 to content processing device 110. To create and/or store custom media channels 170, mixing server 130 also accesses media metadata 150 and custom channel profiles 160. A custom media channel 170 includes a logical concept of an aggregated collection of media content 155 and/or advertising content 140, e.g., video clips, along with associated media metadata 150 and/or advertising metadata 141, which metadata 150 and 141 may include control information such as metadata information about content 155 and 140, play out order information, channel policy control information, etc. Content 155 and 140 included in a custom media channel 170 may be assembled and stored in advance of a user request for custom media channel 170, or it may be assembled and managed in real-time or near real-time, and may not be persistently stored, as discussed further below Although not shown in FIG. 1, note that either VOD server 120 or mixing server 130 may also provide an interactive program guide (IPG) or the like including video on demand options. Alternatively, an IPG, if included in system 100, may be provided by a separate server accessible to content processing device 110, and moreover the IPG may be provided separately from any menu for video on demand services or custom media channels 170.

Advertising content 140 and advertising metadata 141 are generally stored in an advertising database 142, e.g., a relational database or the like, included in or associated with an advertising server 145. Advertising content 140 may include advertisements encoded in a variety of multimedia formats. For example, advertising content 140 may be in any one of a number of known formats for multimedia files such as formats according to standards promulgated by the joint photographic experts group (JPEG), the motion picture experts group (MPEG), etc., or some other format, such as known formats for audio content, such as waveform audio format (WAV), MPEG-1 Audio Layer 3 (MP3), etc. Further, advertising content 140 is likely associated with advertising metadata 141 sufficient to identify particular items of advertising content 140, e.g., according to advertisers, categories of advertisement, rate paid for the advertisement, subject matter of the advertisement, geographic association of the advertisement, etc.

Advertising server 145 provides advertising content 140 in response to requests, e.g., from mixing server 130. Such requests may include as parameters information from a custom channel profile 160 or some other source of targeted advertising profile information.

Media content 155 is provided by content sources 135. Media metadata 150 includes information about media content 155. Media metadata 150 and media content 155 may be stored in a media database 156, e.g., a relational database or the like. Content sources 135 may include a wide variety of sources for multimedia content 155. Accordingly, for a particular item of media content 155, media metadata 150 may include values for a wide variety of attributes. Such attributes may include, for example, the identity of a content source 135, the type of media content 155, e.g., video, audio, etc., a date associated with media content 155, a geographic location associated with media content 155, a subject matter associated with media content 155, e.g. sports, news, weather, entertainment, etc., one or more keywords associated with the multimedia content 155, etc.

In one embodiment, an individual media content item 155 may contain content pertaining to a single, specific topic. For example one media content 155 item could be a video clip for a specific news story, while another item of media content 155 could be a video clip for another story. A third item of media content 155 could contain a video clip for a specific segment of a popular television show (e.g., David Letterman's Top Ten), etc. Accordingly, a fresh set of media content 155, e.g., new video clips, could be made available in media database 156 on a periodic, e.g., daily, basis. In addition, each clip may be relatively short in duration, e.g., less than 5 minutes, and may contain content 155 specific to a relatively narrow, well defined topic. Further, the useful lifespan of a given item of media content 155, e.g., a video clip, might be relatively short (e.g., 24 hours), since older items will eventually be replaced by newer, more relevant items. It is to be understood that embodiments involving items of media content 155 having longer duration and/or longer useful lifespans are also contemplated.

Media content 155 may be in any one of a number of multimedia formats, e.g., the formats mentioned above with respect to advertising content 140. Media content 155 is generally associated with a unique identifier according to which a particular file of media content 155 may be stored, retrieved, associated with media metadata 150, etc. Media content 155 and media metadata 150 may be stored in separate databases, a single database, on separate servers, on a single server, etc. It is to be understood that media content 155 and media metadata 150 may be stored and associated in a relational format, according to various file systems that accommodate multimedia data, or various software packages for storing and providing multimedia data.

Custom channel profiles 160 may be created and stored in association with a profile server 165. The purpose of a profile 160 is to provide criteria for selecting media content 155 to be included in a given custom media channel 170 for a user, as well as to provide other policy control information related to the retrieval and playback of a channel 170. Accordingly, profile 160 may include information by which media metadata 150 may be queried, and according to which it may be determined whether an item of media content 155 meets criteria specified in custom channel profile 160. Criteria for selecting media content 155 may include categories of content 155 in which a user is interested, e.g., news, sports, weather, etc. Other information relevant to retrieval and playback of the channel 170, e.g., control information, may include a specification of a playback mode for the channel 170. i.e., whether the channel 170 is to be played back without interruption between clips of content 155, whether the channel 170 should allow control such as is supported by Real-time Streaming Protocol (RTSP) to allow skipping between clips of content 155, pausing or stopping playback of the channel 170, etc.

A custom channel profile 160 and a custom media channel 170 have a one-to-one relationship, according to certain embodiments. However, embodiments are possible in which a single profile 160 is used to define and manage control information associated with multiple custom media channels 170. For example, a particular user or a particular content processing device 110 may be supported by a single profile 160, i.e., all custom media channels 170 associated with the user or content processing device 110 may be governed by a single profile 160.

Further, embodiments are possible that include different types of profiles 160 that efficiently encode information that applies to both individual custom media channels 170 and groups of custom media channels 170. For example, a playback profile 160 may specify available playback options, e.g., a playback profile 160 may specify whether a user may skip between items of media content 155 included in the custom media channel 170, whether the user may fast-forward through items of advertising content 140, etc. A playback profile 160 then may be linked to multiple custom media channel profiles 160 for channels 170 having different content selection criteria but sharing a set of playback rules. When combined, such multiple profiles 160 together may specify the behavior of the channels 170 as well as the criteria for selecting content for such channels 170.

A custom channel profile 160 is generally created by a user of computer 105 accessing profile server 165 through network 125. However, embodiments are also possible and likely in which content processing device 110 is used to create, modify, and/or delete profiles 160. Moreover, some or all of profiles 160 may be created by a provider of profile server 165. For example, a user of content processing device 110 may not be provided with the opportunity to specify playback modes, although playback modes may be specified by a provider of profile server 165, generally also the provider of content processing device 110 and video distribution network 126.

Various playback modes are possible, including an "interactive" mode in which a user would see a menu listing particular items of media content 155 in a custom media channel 170, e.g., organized according to categories of items of media content 155, thereby allowing a user to select a particular item of media content 155 much as a user could select a particular track from a compact disk (CD) or digital video disk (DVD). Another playback mode provides "continuous play" of content from a custom media channel 170, i.e., a user would see all content 155 from a given custom media channel 170 specified in an order determined according to a fixed policy or policy information specified in the profile 160 associated with the channel 170. Yet another playback mode is a variation of the "continuous play" playback mode in which a user has the option to use controls such as "skip," "fast-forward," "pause," "return to menu," etc. such as may be enabled by real-time streaming protocol (RTSP). Further, in this variation of the "continuous play" mode, "skip commands" and the like are possible that cause a skip not just from one item of media content 155 to another, but from one category of media content 155 to another, i.e., from an item in a first category to an item in a second category, or even from one custom media channel 170 to another customer media channel 170.

In any event, profile server 165 generally provides a graphical user interface (GUI) through which a user may provide information for a profile 160. Such information generally includes a username and may include other identifying information along with information concerning topics of interest to the user. For example, a profile 160 may include fields corresponding to fields stored in metadata 150, e.g., the identity of one or more content sources 135 of interest to a user, specific programming or media files associated with a content source 135 of interest to the user, one or more types of media content 155 of interest to the user, dates or time periods that a content source 135 is of interest to a user, geographic locations of interest to the user, subject matter categories of interest to the user, and one or more keywords to provide for keyword searches or queries to locate media content 155 of interest to a user.

Computing devices such as computer 105, content processing device 110, VOD server 120, mixing server 130, etc. may employ any of a number of computer operating systems known to those skilled in the art, including, but by no means limited to, known versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., and the Linux operating system. Computing devices may include any one of a number of computing devices known to those skilled in the art, including, without limitation, a computer workstation, a desktop, notebook, laptop, or handheld computer, or some other computing device known to those skilled in the art. Content processing device 110 generally is a specialized device for receiving video signals 128 from head end 127 via network 126, and may be provided with a proprietary or specialized operating system other than those enumerated above. For example, in one embodiment, content processing device 110 is an STB provided with a real time operating system (RTOS) such as is known. However, it is to be understood that content processing device 110 may be a computing device such as one of those enumerated above, so long as the computing device is capable of executing instructions as described herein.

Computing devices such as computer 105, content processing device 110, servers 120 and 130, etc. generally each include instructions executable by one or more computing devices such as those listed above. Computer-executable instructions may be compiled or interpreted from computer programs created using a variety of programming languages and/or technologies known to those skilled in the art, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium includes any medium that participates in providing data (e.g., instructions), which may be read by a computer. Such a medium may take many forms, including, but not limited to, non-volatile media, volatile media, and transmission media. Non-volatile media include, for example, optical or magnetic disks and other persistent memory. Volatile media include dynamic random access memory (DRAM), which typically constitutes a main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Databases such as databases 142, 156, etc. may include a file system on a file server, a relational database management system (RDBMS), etc. An RDBMS generally employs the well known Structured Query Language (SQL) in addition to a language for creating, storing, editing, and executing stored procedures. Other kinds of databases are also possible, such as a hierarchical database, an application database in a proprietary format, etc. Databases 142, 156, etc. generally includes a computing device employing a computer operating system such as one of those mentioned above, and may be accessed via a network such as network 125 or some other network, such as a local area network (LAN), wide area network (WAN), etc.

Figure 2:
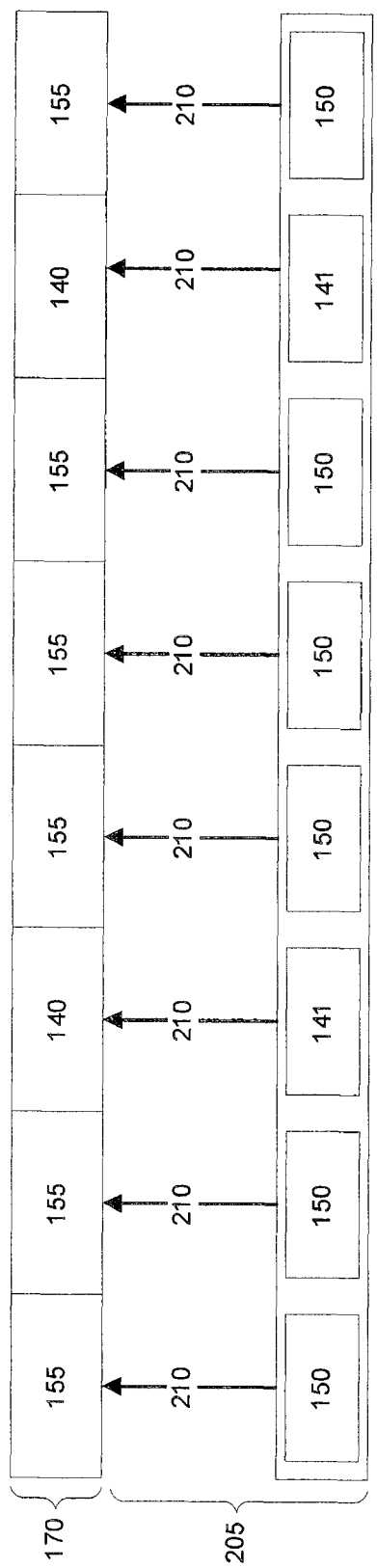
FIG. 2 illustrates an exemplary custom media channel and an exemplary playlist.

FIG. 2 illustrates an exemplary custom media channel 170 and an exemplary playlist 205. As seen in FIG. 2, a custom media channel 170 includes advertising content 140 and media content 155, generally assembled and provided to content processing device 110 according to playlist 205. Custom media channel 170 is generally associated with a playlist 205, as illustrated in FIG. 2. In general, the particular advertising content 140 and/or media content 155 included in custom media channel 170 depends at least in part on a custom channel profile 160 associated with a custom media channel 170. Creation of custom media channels 170, and heuristics according to which particular advertising content 140 and media content 155 are included in custom media channel 170 are discussed further below.

Playlist 205 determines an order in which items of advertising content 140 and media content 155, e.g., files stored in databases 142 and 156, may be provided in custom media channel 170. A custom media channel 170 may include multiple multimedia files that are retrieved by mixing server 130 from databases 142 and/or 156 and sequentially streamed, as a single custom media channel 170, to content processing device 110 or computer 105, possibly in response to a user request for a custom media channel 170 on a real-time or near real-time basis. Accordingly, a custom media channel 170 may include different kinds of multimedia files, e.g., MPEG files and JPEG files, etc. However, in some embodiments—especially those that involve downloading the content of a custom media channel to a device for temporary storage and later, possibly offline, access—a custom media channel 170 may be instantiated as a single multimedia file, e.g., an MPEG file, created by aggregating or concatenating various items of advertising content 140 and/or media content 155. In these embodiments, the package of information that constitutes the custom media channel could include both a set of content elements comprised of media content 155 and advertising content 140) as well as other control information such as a playlist 205 and other associated control data.

To specify the particular items of media content 155 and/or advertisements 140 included in custom media channel 170, and the order in which such files are provided, playlist 205 includes an ordered list of reference pointers 210 to items of media content 155 and advertising content 140. Such pointers 210 may be associated with media metadata 150 and/or advertising metadata 141 stored as part of playlist 205 sufficient to identify a source location for an item of media content 155 or similar information for advertising content 140. Such source location may be within one of databases 142 or 156, which generally collect advertisements 140 and media content 155 respectively for inclusion in custom media channels 170. However, embodiments are also possible and contemplated in which such source location is a content source 135, which may be virtually any source for multimedia content accessible through network 125. For example, a pointer 210 could include a uniform resource locator (URL) or the like for locating and retrieving an item of media content 155 via network 125. Also, source location references may also refer to files stored on DVR 112. Further, metadata 150 and 141 in playlist 205 may be used to generate a menu of items of media content 155 and to allow a user to select, skip, etc. items of media content 155 included in channel 170. Moreover, in certain embodiments, playlist 205 may distinguish between media content 155 and advertising content 140. Accordingly, policy control information may be included in playlist 205 to specify how and when to dynamically mix media and advertising content. Thus, advertising content 140 may to be provided according to various rules, e.g., a frequency-based rule (e.g., every $3^{rd}$ item), a rate based rule (e.g., play advertising content 140 commanding higher rates first), etc., instead of according to a strictly order-based regimen.

As discussed further below, playlist 205 is generally generated upon a user request for custom media channel 170. That is, when content processing device 110 sends a request for a custom media channel 170 to mixing server 130, playlist 205 is generated and used to retrieve, e.g., from databases 142 and/or 156, and deliver to content processing device 110, items of media content 155 and/or advertisements 140, i.e., multimedia files, included in custom media channel 170. Further, a custom media channel 170 and/or a playlist 205 may be created according to a schedule implemented in mixing server 130. For example, playlist 205 may be downloaded to DVR 112, e.g., when content processing device 110 is powered on and/or attempts to connect to network 125, whereupon playlist 205 may be stored to await user access of custom media channel 170. In another embodiment, after being created according to a schedule, custom media channel 170 is stored within mixing server 130 or an associated database and streamed to content processing device 110 upon the demand of a user. Alternatively, after being created according to a schedule implemented in mixing server 130, custom media channel 170 may be downloaded to content processing device 110 and stored in DVR 112, from which it may be retrieved upon the demand of the user. Custom media channels 170 accordingly could be downloaded in their entirety or as a series of incremental updates. Yet further alternatively, DVR 112 could be provided with instructions by mixing server 130 to record particular channels from network 126 at particular times, without requiring media content 155 to be download from mixing server 130.

Further, in some embodiments, playlist 205 is generated on a scheduled basis, and includes information for retrieving from a source or sources such as databases 142 and 156 specific multimedia files representing advertising content 140 and/or media content 155 to be provided in custom media channel 170. Accordingly, when content processing device 110 sends a request for a custom media channel 170 to mixing server 130, playlist 205 may be used to retrieve and stream to content processing device 110 files included in custom media channel 170. Creation, storage, and access of custom media channels 170 are discussed in further detail below with respect to FIGS. 3-5.

FIG. 3 illustrates an exemplary process 300 for creating a custom media channel profile 160.

In step 305, a user logs in to profile server 165. In this step, the profile server 165 performs operations to verify the identity of the user and the user's rights to manipulate one or more custom media channel profiles 160. Generally the user, via computer 105, accesses profile server 165 through packet switched network 125. Profile server 165 generally provides a user interface such as a graphical user interface (GUI) through which the user may interact with profile server 165. For example, network 125 may include the Internet, and profile server 165 may be accessed via the World Wide Web. Upon accessing a webpage provided by profile server 165, which webpage is displayed on a display of computer 105, the user may provide a username and password that had previously been provided to the user and stored in profile server 165, thereby allowing the user to be logged in to profile server 165. Other identification credentials besides a username and password may also be used instead. It is also possible that a user account may be created in step 305 according to a password, personal identification number, or the like provided to the user, or that a user account may be created in a separate process, validated by a provider of profile server 165, wherein the user may then log in to profile server 165 as described herein. Further, a user accessing profile server via content processing device 110 could be automatically logged in to profile server 165 according to a unique or substantially unique identifier stored in content processing device 110.

Next, in step 310, profile server 165 provides a user interface, e.g., a webpage or some other GUI, which allows the user to create a new channel profile 160, or to select a pre-existing profile 160 to modify. If a pre-existing profile 160 is selected, then profile server 165 retrieves information related to the profile 160 from persistent storage in preparation for displaying such information to the user.

Next in step 315, the profile server 165 may generate a user interface that includes a form or the like that includes fields for displaying and updating information for profile 160. Examples of fields that may be included in a custom channel profile 160 are discussed elsewhere herein, e.g., below with respect to step 320.

Next, in step 320, the user provides information for profile 160, e.g., by entering information in one or more fields in a webpage provided as described above with respect to step 315. For example, the user may indicate an interest in receiving a particular media file or set of media files every time the file or files are updated in a content source 135. Similarly, the user may indicate an interest in receiving content broadcast from a particular content source 135 on a particular day at a particular time. However, information provided for profile 160 may be less specific. For example, a user may simply specify subject matter of interest or keywords associated with media of interest to the user. To take an example, a baseball fan could indicate the keyword "baseball" possibly along with the name of a team, or perhaps could select the sport of baseball and/or a team name from a menu, drop-down list, or the like. In yet another example, a user could specify key words or categories related to news topics of interest to the user. For example, the user could specify an interest in categories listed in the webpage that included world news, business news, political news, agriculture news, etc., along with key words such as the name of a celebrity, a sports team, a city, etc.

Further in step 320, having specified categories or particular items of media content 155 to be included in the playlist 205, a user may also specify an order in which such categories or items of media content 155 are to be presented in playlist 205. For example, a user might specify that sports media content 155 should be presented prior to weather media content 155, which in turn should be presented prior to news media content 155.

Step 320 may be executed for a particular user with respect to more than one profile 160; that is, a particular user may be associated with multiple profiles 160. Having multiple profiles 160 would, among other things, allow the user to define multiple custom media channels 170, i.e., one associated with each profile associated with the user. However, it is also possible have multiple custom media channels 160 defined by a single profile 160.

Next, in step 325, the user clicks a button or the like to indicate submission of the information for profile 160 provided as described above with step 320, whereupon profile server 165 stores the newly created or updated profile 160. As mentioned above, custom channel profile 160 is generally stored in a relational database or the like associated with or included in profile server 165. Accordingly, a custom channel profile 160 may be one or more records in one or more tables in a relational database, such records generally identified by an identifier associated with a user. In any event, as illustrated in FIG. 1, custom channel profiles 160 are generally accessible by mixing server 130.

Following step 325, process 300 ends. It is to be understood that process 300 provides only an illustrative example of how a custom channel profile 160 could be created and managed. Certainly other variations are possible. Moreover, custom media channel profile 106 configuration data need not be organized along the lines of individual custom channels, but could be organized according to other schemes or may be embedded within other profile data structures (e.g., an overall user profile), as mentioned above.

FIG. 4 illustrates an exemplary process 400 for instantiating one or more custom media channels 170.

In step 405, mixing server 130 receives an instruction, e.g., a message triggering it to create one or more custom media channels 170 based on one or more custom channel profiles 160. In some embodiments, the trigger to create a custom media channels 170 results from a user request to access the channel 170. That is, a playlist 205 may be generated and a custom media channel 170 may be created in real-time or near real-time when a user "tunes" to the channel 170 or otherwise selects the channel 170 for viewing through playback device 115. Creating and delivering custom media channel 170 in real-time or near real-time based on the custom channel profile 160 allows for not only providing the user with customized content, but also for providing the user with the most up-to-date content. Further, creating and delivering custom media channel 170 in real-time or near real-time means that computer and network resources are not unnecessarily consumed creating and storing custom media channels 170 that a user might never access, or that might become out-of-date before a user accesses access them.

Embodiments are also possible in which a custom media channel 170 is created and stored prior to a user's request to access the channel 170. For example, mixing server 130 could receive a message from profile server 165 that a custom channel profile 160 has been created or revised. Similarly, mixing server 130 could receive a message that media content 155 had been updated, or that new media content 155 was available. Alternatively, mixing server 130 may be programmed to query media metadata 150 at predetermined intervals, e.g., once every 3 hours, twice per day, etc., to determine any changes to media content 155 relevant to a profile 160. For example, media metadata 150 may include a timestamp or the like in addition to other identifying information according to which a query from mixing server 130 may determine whether new or revised media content 155 is available.

Various mechanisms that may be used for sending and receiving messages to and from mixing server 130 are known, e.g., a database trigger in a database storing profiles 160 may cause a message for mixing server 130 to be sent to a queue manager such as IBM WebSphere MQ sold by International Business Machines Corp. of Armonk, N.Y., which in turn queues and sends messages to mixing server 130. Receipt of the message may then cause mixing server 130 to invoke a process for creating or modifying one or more custom media channels 170 based on a profile 160 provided in the message.

Next, in step 410, mixing server 130 analyzes the custom channel profile 160 received in step 405 to formulate a query of media metadata 150. As mentioned above, media metadata 150 may be stored in a relational database associated with or included in mixing server 130. A variety of queries of media metadata 150 are possible based on a profile 160. For example, if a profile 160 indicates a particular content source 135 and further indicates particular days and times of interest with respect to the content source 135, the query formulated in step 410 includes as parameters the indicated content source 135 in the indicated days and times of interest to determine if any media, e.g., a video file or files, is available from the indicated content source 135 at the indicated days and times. Similarly, if a profile 160 indicates a particular subject of interest, e.g., sports or a particular keyword, e.g., "baseball," then the subject of interest or keyword may be parameters for the query. It is also possible, as discussed further with reference to step 440 below, that multiple queries of media metadata 150 may be formulated based on a profile 160.

In some embodiments, step 410 also includes formulating a query for advertising metadata 141. Including advertising content 140 in a custom media channel 170 advantageously provides additional revenue opportunity for a provider of system 100. A query for advertising content 140 may be formulated in the same general manner as described above with reference to a query for media metadata 150. That is, it may be desirable to tailor advertising content 140 according to information in profile 160. However, it is also possible for advertising content 140 to be selected according to some other criteria, for example, according to a number of insertions that an advertiser has paid for, according to a random selection, etc. Advertising content 140 could also be selected based on user data external to profile 160, such as a separate user profile maintained specifically for identifying and associating with users advertising content 160. Such a profile might contain demographic information such as a user's location, services subscribed to, etc.

Further, embodiments are possible and likely in which advertising content 140 is inserted into custom media channel 170 after process 400 is complete. For example, a number of items of advertising content 140 to be inserted into custom media channel 170 may be determined according to an overall length of custom media channel 170, it may be selected in inserted at appropriate intervals into custom media channel 170 after custom media channel 170 is complete.

Next, in step 415, mixing server 130 executes the query or queries, e.g., for media content 155 and advertising content 140, formulated in step 410. It is to be understood that mixing server 130 may effectively execute the query for metadata 150 by providing it to a relational database or the like including metadata 150 that is associated with mixing server 130. A query for advertising content 140 may be provided to advertising server 145. Such queries may be provided in a number of formats, e.g., structured query language (SQL), as parameters in a uniform resource locator (URL), etc.

Next, in step 420, mixing server 130 receives results of the query or queries executed in step 415, and evaluates the results to determine if the query results identify any media content 155, e.g., any video file or files. If the query executed in step 415 does not return any media metadata 150 associated with media content 155, then process 400 proceeds to step 422. However, if media content 155 is identified in the query executed in step 415, then process 400 proceeds to step 425.

Mixing server 130 may also determine whether any advertising content 140 has been returned as the result of a query executed in step 415, if a query for advertising content 140 was executed. However, determination of step 420 generally focuses solely on whether any media metadata 150 has been returned, because it is generally not desirable to create a custom media channel 170 including only advertising content 140. Further, as discussed above, advertising content 140 may be inserted into custom media channel 170 after process 400 is complete. Nonetheless, it is to be understood that embodiments are possible in which the determination of step 420 may include a consideration of whether any advertising content 140 has been identified.

In step 422, mixing server 130 generates what is referred to as an "empty playlist," i.e., a playlist 205 that does not include any pointers 210 to media content 155. Generally such a playlist 205 causes content processing device 110 to generate a message informing a user that no media content 155 presently satisfies criteria for the requested custom media channel 170. Following step 422, process 400 ends.

In step 425, mixing server 130 uses the media metadata 150 and/or advertising content 140 returned in step 420 to generate a list of media content 155 and/or advertising content 140 to be included in a custom channel 170 based on custom channel profile 160. Information from profile 160 may be used to generate the playlist 205. For example, profile 160 may include an indication that media content 155 relating to a first category of media content, e.g., sports, is of more interest to a user than media content 155 relating to a second category, e.g., weather. Thus, the order of media content 155 reflected in playlist 205 may be at least partly determined by profile 160.

Further, profile 160 may include records providing a history of items of media content 155 that a user has viewed in a custom media channel 170. Such records may be useful in order to avoid including in a custom media channel 170 an item of media content 155 that was previously provided to the user in a channel 170. Further, history records may be used to provide special treatment for items of media content 155 that have previously been included in a custom media channel 170. For example, such items of media content 155 could be flagged as "Previously Viewed" or the like in playlist 205, which flag could be communicated to the user through playback device 115, e.g., in a menu, in a message displayed over or next to a playback of custom media channel 170, etc., thereby allowing the user to skip playback of such item of media content 155 if desired.

Next, in step 430, mixing server 130 determines an order for the media listed in step 425. For example, as mentioned above, a profile 160 may indicate a ranking of a user's interest in certain topics. For example, a user may be interested in receiving baseball news, but may be most interested in a particular team, such as the Detroit Tigers. Accordingly, a custom media channel 170 may provide files having to do with the general topic, e.g., baseball, but may provide files relating to the particular team of interest, e.g., the Detroit Tigers, first.

Further, rules may be implemented to determine the frequency with which advertising content 140 is interspersed with media content 155 in a custom media channel 170. In general, it is desirable to maximize revenue for the provider of system 100 and/or the operator of mixing server 130, all the same time not providing so much advertising content 140 so as to cause the user to discontinue use of the custom media channel 170. Accordingly, it is possible and even likely that some of the advertising content 140 that may have been returned in step 420 will not be included in the custom media channel 170. Like media content 155, advertising content 140 may be included in a custom media channel 170 according to a variety of heuristics, e.g., random selection, ranking according to topical association, ranking according to the rate or rates paid by an advertiser, etc.

Next, in step 435, mixing server 130 generates a playlist 205 based on the query results listed an ordered as described above with reference to steps 425 and 430.

Next, in step 440, mixing server 130 delivers e.g., isochronously streams or progressively downloads, media content 155 and/or advertising content 140 to content processing device 110. Generally, according to playlist 205, content 155 and/or advertisements 140 are retrieved from databases 142 and/or 156 on a real-time or near real-time basis, that is, when needed as part of a custom media channel 170. However, as noted above, pointers 210 in playlist 205 could be used to indicate a wide variety of content sources 135. Alternatively, or possibly also at the same time, mixing server 130 stores and/or bundles and downloads to a content processing device 110 the custom media channel or channels 170 created by one or more executions of steps 415 through 435. In cases where there is limited storage available on the mixing server 130 and/or on DVR 112 and its associated storage/memory, playlist 205 may be only stored in either mixing server 130 or DVR 112 in step 440. In these cases, as described further below with respect to process 500, mixing server 130 uses playlist 205, including pointers 210, to retrieve and deliver to content processing device 110 multimedia files included in custom media channel 170. Further, storing custom media channels 170 generally means storing the multimedia file or files included in the custom media channel 170 in a database, a file system, or the like, to be made available when a particular user requests the custom media channel 170, as described further below with reference to FIG. 5. Accordingly, as discussed above, a single multimedia file may be stored in a database associated with mixing server 130 or may be downloaded to content processing device and stored in DVR 112. Further, multiple multimedia files to be included in custom media channel 170 may be stored in either mixing server 130 or DVR 112, the order in which such files are provided to a user being governed by playlist 205.

Following step 440, process 400 ends.

Figure 5:
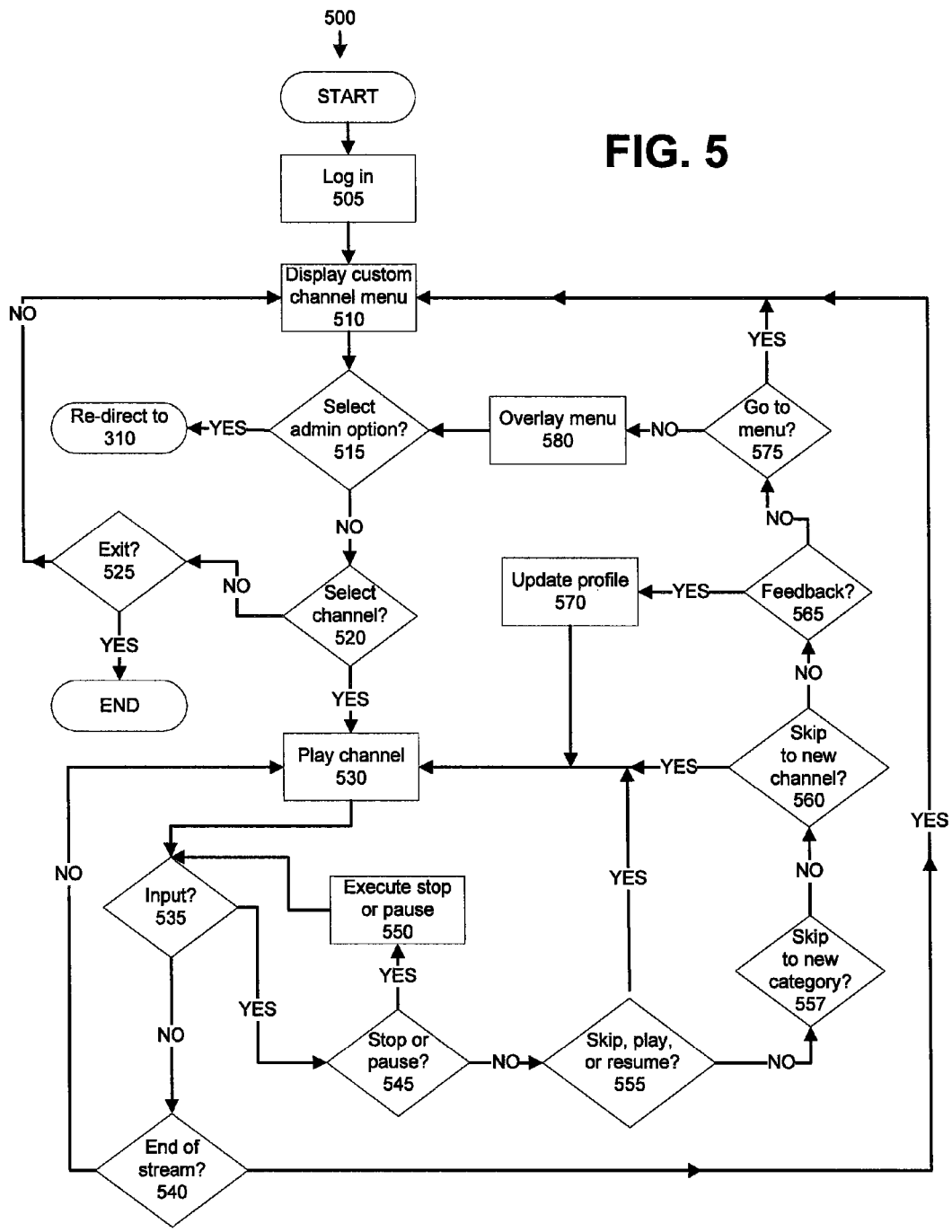
FIG. 5 illustrates an exemplary process for accessing and interacting with a custom media channel.

FIG. 5 illustrates an exemplary process 500 for controlling access to and interaction with one or more custom media channels 170. It should be understood that custom media channels 170 may be accessed through virtually any computing device having access to packet switched network 125, or otherwise having access to mixing server 130. Accordingly, process 500 may apply to access of custom media channels 170 by either a computer 105 or a content processing device 110. It should also be understood that process 500 represents one exemplary process for interacting with custom media channels 170 and that other variations are possible for accessing, navigating, and interacting with one or more custom media channels. For example, FIGS. 6 and 7, discussed below, illustrate exemplary process 600 and 700 respectively that are each largely variations of certain of the steps in process 500. However, these are but two variations, and many other variations are possible.

Further, as mentioned above, one or more custom media channels 170 may be downloaded to content processing device 110 and stored within DVR 112 (or other storage device) to await a user request for custom media channels 170. Custom media channels 170 could similarly be downloaded to computer 105. Therefore, in some embodiments, a client device such as computer 105 for content processing device 110 need not be connected to network 125 at the time a user requests access to a custom media channel 170.

Process 500 is generally performed by a playback application that may be executed within client 105, content processing device 110, or mixing server 130. The playback application may be stored on a computer readable medium and is generally responsible for receiving a user request for a custom media channel 170, and for providing the custom media channel 170 for playback on player 115, computer 105, etc.

In step 505, a user logs in to the playback application. This login may be accomplished in several different ways, or skipped. For example, a user accessing control 111 may select a channel in content processing device 110 associated with a custom media channel 170 or may navigate an interactive program guide to access an area of the program guide's menu structure dedicated to custom media channels. Further, a user of computer 105 may navigate to a webpage, a screen or window in a software application that plays multimedia files, or the like that displays an interface for logging in to mixing server 130, or may select a webpage or a link in a webpage associated with a custom media channel 170. Content processing device 110 or computer 105 may include program instructions for displaying an interface prompting a user to enter a pass code or some other unique user identifier using control 111. Content processing device 110 or computer 105 may then validate this input, or, in embodiments in which the playback application is located on mixing server 130, this input may then be transmitted to mixing server 130.

Alternatively, content processing device 110 or computer 105 may include program instructions for validating an input, or for transmitting an identifier to mixing server 130, without any user input. In this case, all users of content processing device 110, computer 105, etc. are effectively treated as a single user. Moreover, the user may not even be aware that step 505 has been executed. In any event, it should be understood that, although not shown in FIG. 5, process 500 will be terminated in the event that an attempt to log in (authenticate and authorize the user) is unsuccessful.

Next, in step 510, once a user's login information has been validated, the playback application may provide a menu of custom channel options to be displayed to the user. For example, such a menu may be provided to content processing device 110 and displayed on media player 115. Similarly, a menu may be provided as a webpage or the like to computer 105 through packet switched network 125. If the playback application is located within content processing device 110 or computer 105, the menu may be provided or updated anytime when custom media channels 170 are provided or updated. Alternatively, the playback application may include instructions for constructing a menu based on one or more playlists 205.

The menu displayed in step 510 may provide a variety of options. For example, this menu may be a simple, single-layer menu, or it may be a relatively complex, multi-layer menu structure. For example, the menu may provide the user with the option to administer custom media channels 170, i.e., to create or modify a custom channel profile 160. In addition, the menu may provide the user with the option of playing one or more custom media channels 170. The menu may list custom media channels 170 in a variety of ways. For example, custom media channels 170 may be listed according to names or identifiers selected by a user when creating channel profiles 160. Further, custom media channels 170 may be listed according to attributes, e.g., categories, from profile 160 associated with a custom media channel 170, e.g., "baseball," "weather," etc. Alternatively, custom media channels 170 may be organized into other groups or structures (e.g., organized based by user or user profiles). Finally, as noted above, particular items of media content 155 included in a custom media channel 170 may be listed in the menu displayed in step 510. Accordingly, embodiments are possible and likely in which a user may interactively browse and select one or more clips, i.e., items of media content 155, for playback from the playlist of a media channel 170 as rendered via the menu displayed in step 510.

From the foregoing it should be clear that a user may select a menu option by navigating with arrow keys or the like using control 111 to highlight options displayed on media player 115, selecting a number on a numeric keypad on control 111, by selecting a link in a webpage displayed on computer 105, etc. If the playback application is located on mixing server 130, the user's selection of a menu option may be transmitted to mixing server 130 in a variety of ways. For example, a user's selection may be transmitted from computer 105 to mixing server 130 using known protocols such as hypertext transfer protocol (HTTP). Further, extensions to RTSP are possible for allowing selection of menu options to be provided to mixing server 130 from content processing device 110.

Next, in step 515, the playback application determines whether a request for an administrative menu option has been received. If so, the user may be redirected to profile server 165 to administer one or more profiles 160, e.g., as described above with respect to step 310, or some other mechanism for administering channel profiles 160, e.g., an application on content processing device 110 or computer 105, may be invoked. If no request for an administrative menu option has been received, process 500 proceeds to step 520.

Next, in step 520, the playback application determines whether a request for a custom media channel 170 has been received. If not, process 500 proceeds to step 525. However, if a request for a custom media channel 170 has been received, process 500 proceeds to step 530. Moreover, if a custom media channel 170 has been selected, and more specifically an individual item of content 155, e.g., a clip, has been selected, information related to the selected item of content 155 is maintained for use in step 530 described below.

In one embodiment, step 505 is executed without any user input, and a request for a custom media channel 170 is received when a user accesses a particular video channel in content processing device 110 using control 111. In this case, steps 510 and 515 may be skipped, and the playback application determines in step 520 that a request for the custom media channel 170 associated with the video channel has been received.

In step 525, the playback application determines whether a request to exit the display of custom media channels 170 has been received. If so, process 500 ends. Otherwise, process 500 returns to step 510.

In step 530, the playback application delivers custom media channel 170 for display to the user, e.g., to content processing device 110 or computer 105. For example, custom media channel 170 may include one or more MPEG files, and content processing device 110 may include a coder/decoder (codec) for playing the MPEG files. In embodiments in which custom media channel 170 includes a plurality of multimedia files, such files may be stored in mixing server 130 or an associated database, and delivered according to playlist 205. Alternatively in such embodiments, playlist 205 may be used to determine media content 155 to be included in custom media channel 170, and to retrieve as needed such media content 155 from the appropriate database, e.g., a database associated with mixing server 130. Such media content 155 may then be delivered to content processing device 110 according to an order provided by playlist 205. If in step 510 the user specified a specific content 155 item for viewing, this information is used in step 530 to retrieve and playback the desired content 155 item.

As noted above with respect to step 440 and process 400, media content 155 and advertising content 140 in custom media channel 170 may be delivered to content processing device 110 in a variety of ways. For example, as noted above, playlist 205 may be stored in DVR 112 and used to request media content 155 and/or advertising content 140 in custom media channel 170 when custom media channel 170 is requested by a user. Alternatively, both the playlist 205 and associated content 140 and 155 can be cached on the DVR 112 in advance of a user request for channel 170. In such a scenario, media content 155 and/or advertising content 140 may be provided to DVR 112 according to any of a number of manners, including: (1) a unicast delivery, e.g., isochronous streaming or progressive download, from mixing server 130 via a packet switched network 125; (2) a multicast delivery, e.g., a reliable multicast download such as is known from mixing server 130 via a packet switched network 125, this approach affording better utilization of network 125 by allowing a single multicast flow to be used by multiple endpoints, e.g., content processing devices 110, to receive content as opposed to using multiple unicast (point-to-point) flows of media content 155 and/or advertising content 140 to individual content processing devices 110; (3) receiving video content from broadcast/multicast video streams distributed via video distribution network 126; and (4) receiving content 155 and/or 140 via video distribution network 126 as unicast streams.

Next, in step 535, the playback application determines whether input has been received from the user during the play of custom media channel 170. In general, where the playback application is located on mixing server 130, functionality may be provided with respect to custom media channel 170 similar to that provided for VOD content 121 provided by VOD server 120. As with VOD server 120, messages to and from mixing server 130 may be sent according to RTSP. However, other signaling protocols could also be used. If input has been received, then process 500 proceeds to step 545. Otherwise, step 540 is executed next.

Figure 7:
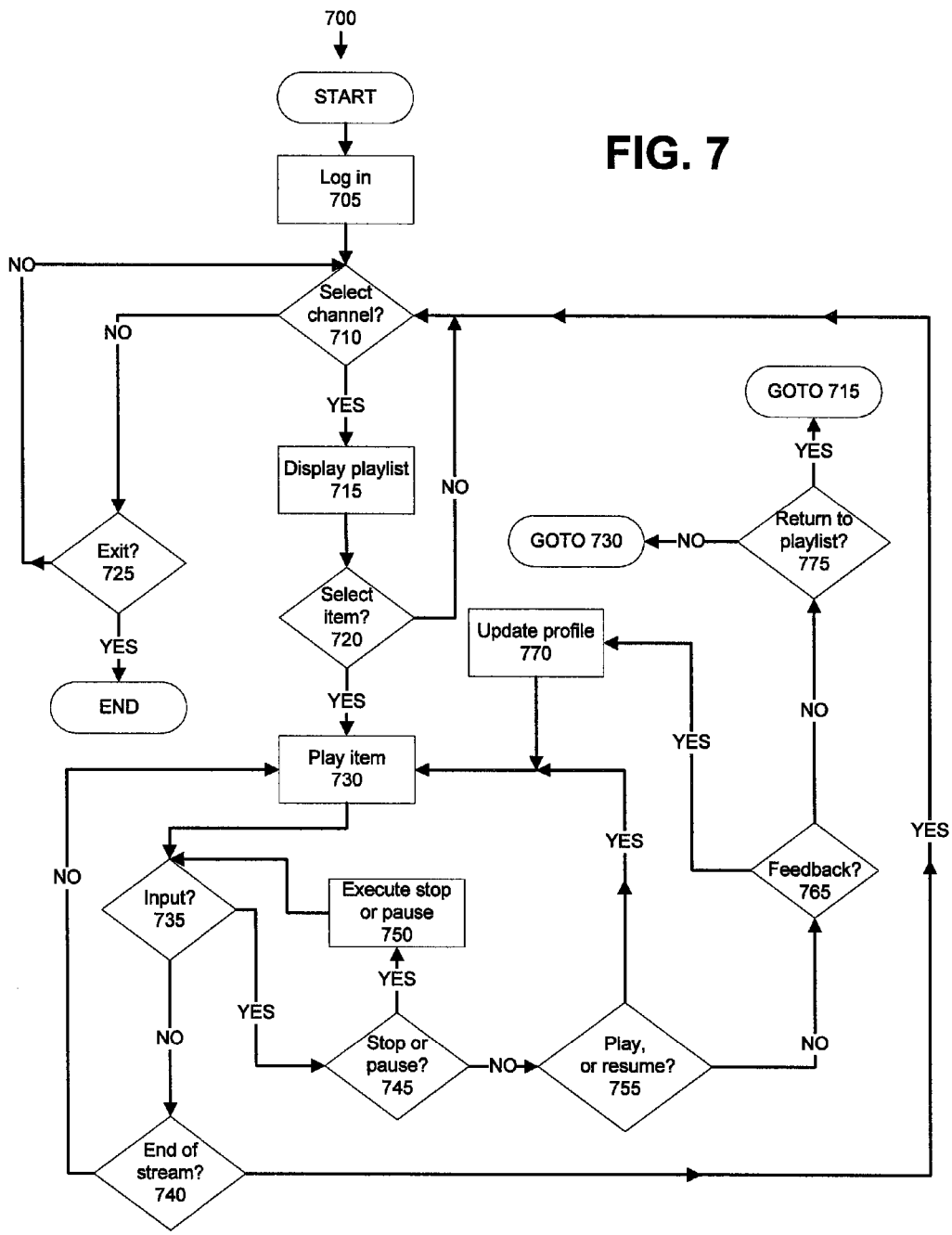
FIG. 7 illustrates an exemplary process for accessing a custom media channel in an interactive mode.

In step 540, the playback application determines whether the end of custom media channel 170 has been reached or when being used in an interactive mode, if the end of the current content item 155 (clip) has been reached. As noted with respect to FIG. 2, custom media channel 170 may be a multimedia file or set of multimedia files, and this determination may therefore involve determining whether an end of file has been reached, and, in embodiments where custom media channel 170 includes multiple multimedia files, determining whether any additional files are referenced in playlist 205. If the end of custom media channel 170 has not been reached, process 500 returns to step 530. However, if the end of custom media channel 170 has been reached, then process 500 returns to step 510. Alternatively, when channel 170 is accessed in an interactive mode such as is illustrated in FIG. 7, discussed below, if the end of the current content 155 item, e.g., a video clip, has been reached, then process 500 returns to step 510. By returning to step 510, the process 500 allows the user to select another item of content 155 when used in interactive mode, select another channel 170, or perform administrative operations, e.g., as illustrated in FIG. 3, discussed above.

In step 545, the playback application determines whether the input received in step 535 is a command to stop or pause playback of custom media channel 170. If so, step 550 is executed next. Otherwise, step 555 is executed next.

In step 550, the playback application stops or pauses playback of custom media channel 170. Process 500 then returns to step 535 to await a command to resume playback or to play custom media channel 170.

In step 555, the playback application determines whether the input received in step 535 is a command to resume a paused playback of media channel 170, to play media channel 170 after playback has been stopped, or a command to skip to the next or previous item of media content 155 in a playlist 205. If so, the command is executed, and process 500 returns to step 530. Otherwise, process 500 proceeds to step 557.

In step 557, the playback application determines whether the input received in step 535 is a command to skip to an item of media content 155 belonging to a category of media content 155 other than a category that includes the item of media content 155 presently playing in media channel 170. For example, a user may press a button on control 111, e.g., an arrow key, a number, etc. to indicate a selection to move from a "sports" category to a "weather" category; or from the current category to the next category. Metadata 150 included in playlist 205 generally includes an identification of one or more categories that include media content 155 associated with the metadata 150, thereby allowing for navigation within playlist 205 according to categories of media content 155.

If the input received in step 557 is a command to skip to a content category other than the one that is currently playing, then the playback application updates its record of the current category to a new value, updates its record of the current item playing in the playlist, and returns to step 530 to play the new current item of media content 155 in the new current category associated with custom media channel 170. Otherwise, process 500 proceeds to step 560.

In step 560, the playback application determines whether the input received in step 535 is a command to skip directly to a media channel 170 other than the media channel 170 that is presently playing. For example, the menu displayed in step 510 may indicate a plurality of custom media channels 170 that are available for playing, e.g., according to titles or other descriptions, categories of information, particular sources of media content 155, specified keywords, etc. Pressing a key on control 111 or providing some other input may allow a user to specify that a different media channel 170 should be played. If the input received in step 560 is a command to skip directly to a media channel 170 other than the media channel 170 that is presently playing, then the playback application updates its record of the current channel and returns to step 530 to play the specified channel. Otherwise, process 500 proceeds to step 565.

In step 565, the playback application determines whether the input received in step 535 includes user feedback that may be used to update profile 160. For example, while an item of media content 155 is being played, a portion of a GUI in playback device 115 that is used to display media channel 170 may provide a user with the opportunity to provide feedback concerning the item of media content 155 being played. For example, a user may be instructed to press "1" on control 111 to indicate approval of the item of media content 155, e.g., "show me more like this," and to press "2" on control 111 to indicate that the item of via content 155 is not to the users liking, e.g., "do not show me more like this." Similarly, a user may be provided with a rating scale or the like, e.g., "rate this clip on a scale of 1 to 5," according to which the user may provide feedback concerning an item of media content 155. As mentioned above, user feedback may also be used to update media metadata 150 or the like. If the input received in step 535 is feedback that may be used to update profile 160, then step 570 is executed next. Otherwise, step 575 is executed next.

In step 570, the playback application causes the appropriate updates to be made to profile 160 and profile server 165. This step could also be used to update other information sources. For example, a user profile indicating a user's interest in the channel 170 could be updated. Similarly, metadata 150 relating to items of media content 155 could be updated, e.g., a popularity rating for an item of content 155 could be updated. In general, various methodologies for gathering and reacting to user feedback may be used, so long as the user feedback results in a modification to custom media channels 170 provided to the user following the provision of user feedback. For example, if a user has indicated approval of a particular item of media content 155, then the playback application may instruct profile server 165 to update profile 160 to note that items of media content 155 sharing metadata characteristics with the approved item of media content 155, e.g., in a particular category or associated with a particular keyword associated with the approved item of media content, should be given priority according to the profile 160. Similarly, profile 160 may be updated to reflect that items of media content 155 sharing metadata characteristics with a disapproved item of media content 155 should not be included in custom media channels 170 for the user.

In step 575, the playback application determines whether the input received in step 535 is a command to return to the menu displayed as described above with respect to step 510. If so, process 500 returns to step 510. Otherwise, process 500 proceeds to step 580.

Step 580 is depicted in the FIG. 5 as the only remaining possible input after the inputs described in steps 545-555 have been considered. However, it is to be remembered that process 500 is exemplary, and that other inputs and variations are possible. In any event, in step 580, the playback application provides to content processing device 110, computer 105, etc. instructions for displaying and/or rendering on media player 115 what is referred to as an "overlay menu." An overlay menu is a menu that is similar to the menu displayed in step 510, but which may include only a subset of the options available in the menu displayed in step 510. The name "overlay menu" derives from the fact that the menu is overlaid on top of the playback of custom media channel 170 in the display of media player 115, computer 105, etc., so that a user may view the overlay menu while still viewing the custom media channel 170. The overlay menu may include various options, e.g., options for viewing an administrative interface, for switching to another custom media channel 170, for returning to an IPG menu, etc. Accordingly, step 515 may be executed following step 580.

It is to be understood that some or all of steps 535 and 545 through 580 may be omitted or modified in certain embodiments. For example, in the embodiment mentioned above in which a request for a custom media channel 170 is received when a user accesses a particular video channel in content processing device 110 using control 111, an input to control 111 to change the video channel, effectively stopping the playback of custom media channel 170, may be the only possible input to the playback application while custom media channel 170 is being played.

As noted above, process 500 may end following step 525.

Figure 6:
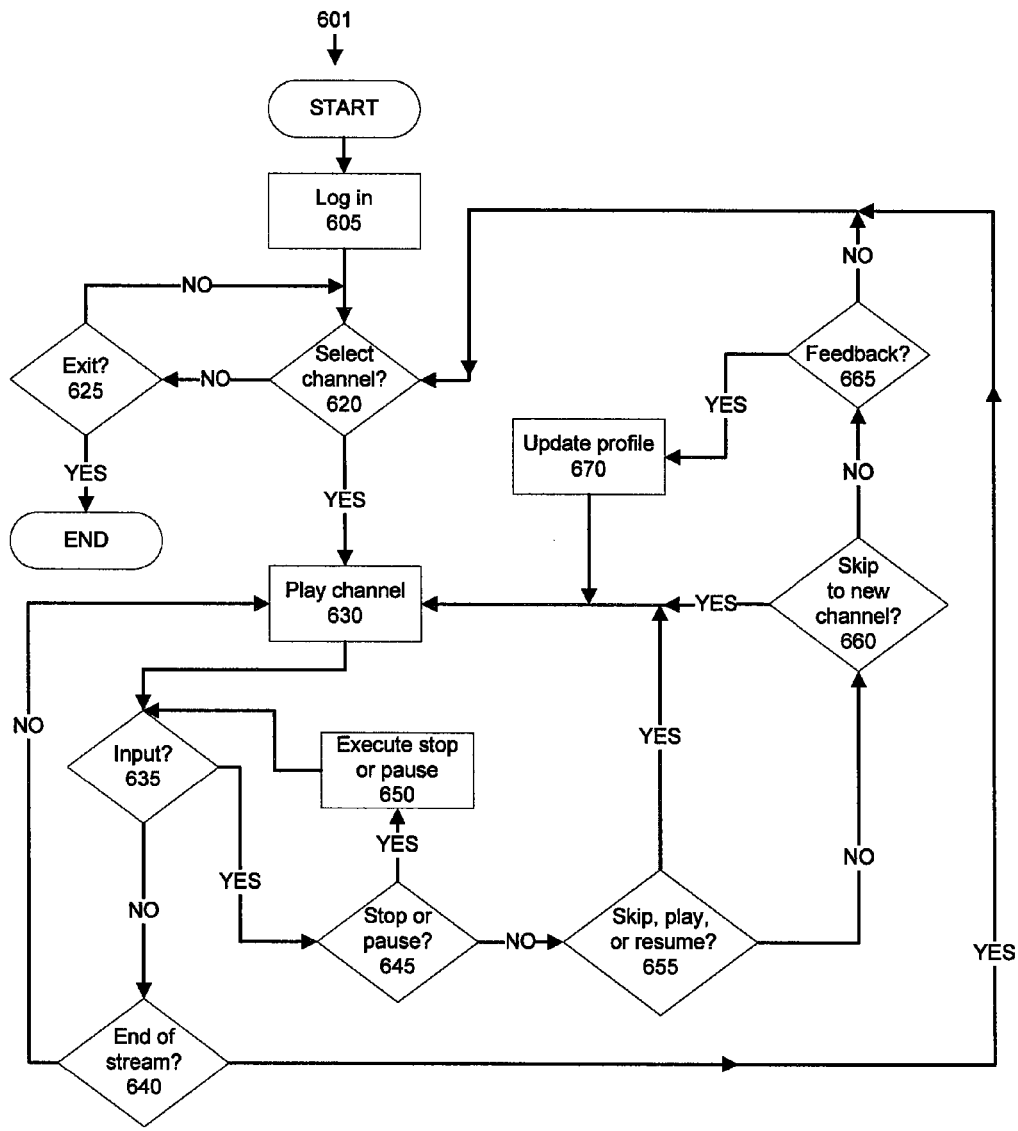
FIG. 6 illustrates an exemplary process for accessing a custom media channel in a channel selection mode.

FIG. 6 illustrates an exemplary process 600 for accessing a custom media channel 170 in a channel selection mode.

In step 605, a user logs in to the playback application. Step 605 is identical or at least similar to step 505 described above with respect to FIG. 5. Step 605 is followed by step 620.

In step 620, the playback application determines whether a request for a custom media channel 170 has been received, i.e., whether a user has selected a particular video channel in content processing device 110 using control 111 that is associated with a custom media channel 170. If not, step 625 is executed next. Otherwise, step 630 is executed next.

In step 625, the playback application determines whether a request to exit the display of custom media channels 170 has been received. If so, process 600 ends. Otherwise, process 500 returns to step 620.

In step 630, the playback application delivers custom media channel 170 for display to the user, e.g., to content processing device 110 or computer 105 in any of the manners described above with respect to step 530.

Next, in step 635, the playback application determines whether input has been received from the user during the play of custom media channel 170, much as was described above with respect to step 535. If input has been received, then process 600 proceeds to step 645. Otherwise, step 640 is executed next.

In step 640, the playback application determines whether the end of custom media channel 170 has been reached, much as described above with respect to step 540. If the end of custom media channel 170 has not been reached, process 500 returns to step 630. However, if the end of custom media channel 170 has been reached, then process 500 returns to step 620.

In step 645, the playback application determines whether the input received in step 635 is a command to stop or pause playback of custom media channel 170. If so, step 650 is executed next. Otherwise, step 655 is executed next.

In step 650, the playback application stops or pauses playback of custom media channel 170. Process 600 then returns to step 635 to await a command to resume playback or to play custom media channel 170.

In step 655, the playback application determines whether the input received in step 635 is a command to resume a paused playback of media channel 170, to play media channel 170 after playback has been stopped, or a command to skip to the next or previous item of media content 155 in a playlist 205. If so, the command is executed, and process 600 returns to step 630. Otherwise, process 600 proceeds to step 660.

In step 660, the playback application determines whether the input received in step 635 is a command to skip directly to a media channel 170 other than the media channel 170 that is presently playing, e.g., by selecting a different channel in content processing device 110. That is, pressing a key on control 111 or providing some other input may allow a user to specify that a different media channel 170 should be played. If the input received in step 660 is a command to skip directly to a media channel 170 other than the media channel 170 that is presently playing, then the playback application updates its record of the current channel and returns to step 630 to play the specified channel. Otherwise, process 600 proceeds to step 665.

In step 665, the playback application determines whether the input received in step 635 includes user feedback that may be used to update profile 160, much as described above with respect to step 565. If the input received in step 635 is feedback that may be used to update profile 160, then step 670 is executed next. Otherwise, step 675 is executed next.

In step 670, the playback application causes the appropriate updates to be made to profile 160 and profile server 165, much as described above with respect to step 570. Following step 670, process 600 returns to step 630.

As noted above, process 600 may end following step 625.

FIG. 7 illustrates an exemplary process 700 for accessing a custom media channel 170 in an interactive mode.

In step 705, a user logs in to the playback application. Step 705 is identical or at least similar to step 505 described above with respect to FIG. 5. Step 705 is followed by step 710.

In step 710, the playback application determines whether a request for a custom media channel 170 has been received, i.e., whether a user has selected a particular video channel in content processing device 110 using control 111 that is associated with a custom media channel 170. If not, step 725 is executed next. Otherwise, step 715 is executed next.

In step 715, a menu is displayed reflecting items of media content 155 included in the playlist 205 associated with the custom media channel 170 requested in step 710. Accordingly, a user may select individual items of media content 155 for playback.

In step 720, it is determined whether a user has selected an item of media content 155, e.g., a video clip, for playback from the menu displayed in step 715. If not, process 700 proceeds to step 710. Otherwise, step 730 is executed next.

In step 730, the playback application delivers the selected item of media content 155 from custom media channel 170 for display to the user, e.g., to content processing device 110 or computer 105 in any of the manners described above with respect to step 530.

Next, in step 735, the playback application determines whether input has been received from the user during the play of the selected item of media content 155, much as was described above with respect to step 535. If input has been received, then process 700 proceeds to step 745. Otherwise, step 740 is executed next.

In step 740, the playback application determines whether the end of the selected item of media content 155 has been reached, much as described above with respect to custom media channel 170 in step 540. If the end the item of media content 155 has not been reached, process 500 returns to step 730. However, if the end of the item of media content 155 has been reached, then process 500 returns to step 710.

In step 745, the playback application determines whether the input received in step 735 is a command to stop or pause playback of the item of media content 155. If so, step 750 is executed next. Otherwise, step 755 is executed next.

In step 750, the playback application stops or pauses playback of the item of media content 155. Process 700 then returns to step 735 to await a command to resume playback or to play the item of media content 155.

In step 755, the playback application determines whether the input received in step 735 is a command to resume a paused playback of the item of media content 155, or to play the item of media content 155 after playback has been stopped. If so, the command is executed, and process 700 returns to step 730. Otherwise, process 700 proceeds to step 765.

In step 765, the playback application determines whether the input received in step 735 includes user feedback that may be used to update profile 160, much as described above with respect to step 565. If the input received in step 735 is feedback that may be used to update profile 160, then step 770 is executed next. Otherwise, step 775 is executed next.

In step 770, the playback application causes the appropriate updates to be made to profile 160 and profile server 165, much as described above with respect to step 570. Following step 770, process 700 returns to step 730.

In step 775, the playback application determines whether the input received in step 735 includes a selection to return to a display of playlist 205. If so, process 700 returns to step 715. Otherwise, process 700 returns to step 730.

As noted above, process 700 may end following step 725.

Conclusion

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A method, comprising:
   determining, by one or more server devices and based upon prior selections of multimedia content by a user associated with a client device, one or more topics of interest to the user;
   forming, by the one or more server devices, a plurality of profiles that are associated with a respective plurality of custom media channels, each profile of the plurality of profiles including:
   users preferences, the user preferences including an indication of the one or more topics of interest to the user, and channel policy control information for a corresponding custom media channel of the respective plurality of custom media channels, the channel policy control information being related to retrieval and playback of the corresponding custom media channel, the channel policy control information including playback modes that include an interactive playback mode and a continuous play playback mode;

creating, by the one or more server devices, a custom media channel, of the plurality of custom media channels, based on a profile of the plurality of profiles, the creating, by the one or more server devices, the custom media channel based on the profile including:

comparing each of a plurality of stored multimedia content to the profile, identifying conforming multimedia content, of the plurality of stored multimedia content, that conforms with the one or more topics of interest to the user and with the channel policy control information, determining respective storage locations associated with the conforming multimedia content, one or more conforming multimedia content, of the conforming multimedia content, being stored at the client device, and other conforming multimedia content, of the conforming multimedia content, being stored externally of the client device, sorting the conforming multimedia content based on the user preferences and the channel control policy information associated with the custom channel, providing, to the client device, a playback list identifying the sorted conforming multimedia content and the respective storage locations, the playback list enabling the client device to provide the sorted conforming multimedia content in an order associated with the sorted conforming multimedia content, providing, to the client device, the other conforming multimedia content before the client device receives a request, from the user, for the custom media channel, and updating the playback list based on providing the other conforming multimedia content;

receiving, by the one or more server devices and from the client device, an indication that the user, when viewing the custom media channel requested another custom media channel; and updating, based on receiving the indication, the profile.

2. The method of claim 1, further comprising:

identifying, based on the profile, advertising content of a plurality of advertising content;

including the advertising content in the provided custom media channel.

3. The method of claim 1, where comparing each of the plurality of stored multimedia content to the profile includes:

accessing metadata relating to the plurality of stored multimedia content; and comparing the metadata to the profile.

4. The method of claim 1, where providing the playback list includes:

providing, to the client device, the playback list after receiving the request for the custom media channel, and where the client device is at least one of: a set-top box, a content processing device, a desktop computer, a laptop computer, or a handheld computer.

5. The method of claim 1, where the client device and the one or more server devices are connected via a packet switched network.

6. The method of claim 1, where updating the profile further comprises: updating the profile further based on at least one of: an input from the user, or prior selections of multimedia content by the user.

7. A non-transitory computer-readable medium to store instructions, the instructions comprising:

one or more instructions that, when executed by a processor of a computer device, cause the processor to identify one or more topics of interest to a user associated with a client device;

one or more instructions that, when executed by the processor, cause the processor to form a plurality of profiles associated with a respective plurality of custom media channels, each profile of the plurality of profiles: user preferences including an identifier of the one or more topics of interest to the user, and channel policy control information for a corresponding custom media channel of the plurality of custom media channels, the channel policy control information including playback modes that include an interactive playback mode and a continuous play playback mode; one or more instructions that, when executed by the processor, cause the processor to create a custom media channel, of the plurality of custom media channels, based on a profile of the plurality of profiles, the one or more instructions to create the custom media channel based on the profile including:

one or more instructions that, when executed by the processor, cause the processor to compare a plurality of stored multimedia content to the profile, one or more instructions that, when executed by the processor, cause the processor to identify, based on comparing the plurality of stored multimedia content to the profile, conforming multimedia content, the conforming multimedia content being one or more of the plurality of stored multimedia content that conform to the one or more topics of interest to the user and the channel policy control information, one or more instructions that, when executed by the processor, cause the processor to determine respective storage locations associated with the conforming multimedia content, one or more conforming multimedia content, of the conforming multimedia content, being stored at the client device, and other conforming multimedia content, of the conforming multimedia content, being stored externally of the client device, one or more instructions that, when executed by the processor, cause the processor to sort the conforming multimedia content based on the user preferences and the channel policy control information, one or more instructions that, when executed by the processor, cause the processor to provide, to the client device, a playback list identifying the conforming multimedia content and the respective storage locations, the playback list enabling the client device to provide the other conforming multimedia content in an order associated with the sorted conforming multimedia content, and one or more instructions that, when executed by the processor, cause the processor to provide, to the client device, the other conforming multimedia content before the client device receives a request, from the user, for the custom media channel, one or more instructions that, when executed by the processor, cause the processor to update the playback list based on the client device acquiring the other conforming multimedia content; one or more instructions that, when executed by the processor, cause the processor to receive, from the client device, an indication that the user, when viewing the custom media channel, requested another custom media channel; and one or more instructions that, when executed by the processor, cause the processor to update the profile based on receiving the indication.

8. The non-transitory computer-readable medium of claim 7, where the one or more instructions to create the custom media channel further include:
one or more instructions to identify, based on the profile, advertising content; and
one or more instructions to include, in the playback list, information identifying the identified advertising content.

9. The non-transitory computer-readable medium of claim 7, where the one or more instructions to compare the plurality of stored multimedia content to the profile include: one or more instructions to identify respective metadata associated with the plurality of stored multimedia content; one or more instructions to compare the identified metadata to the profile to identify conforming metadata; and one or more instructions to identify the conforming multimedia content based on the conforming metadata.

10. The non-transitory computer-readable medium of claim 7, where the playback list is provided to the client device before the client device receives the request, from the user, for the custom media channel.

11. The non-transitory computer-readable medium of claim 7, where the one or more instructions to identify the one or more topics of interest to the user include: one or more instructions to receive, from the user, data identifying user preferences, and one or more instructions to identify the one or more topics of interest to the user based on the data.

12. The non-transitory computer-readable medium of claim 11, where the data is received from another client device associated with the user.

13. The non-transitory computer-readable medium of claim 7, where the instructions further comprises: one or more instructions to update the profile based on a selection of multimedia content by the user, and one or more instructions to update the playback list based on the updated profile.

14. A system, comprising: one or more processors to: determine, based upon prior selections of multimedia content by a user associated with a client device, one or more topics of interest to the user; form a plurality of profiles that are associated with a respective plurality of custom media channels, each profile of the plurality of profile, including: user preferences that include an indication of the one or more topics of interest to the user, and channel policy control information for a corresponding custom media channel of the respective plurality of custom media channels, the channel policy control information being related to retrieval and playback of the corresponding custom media channel, the channel policy control information including playback modes that include an interactive playback mode and a continuous play playback mode; create a custom media channel, of the plurality of custom media channels, based on a profile of the plurality of profiles, the one or more processors, when creating of the custom media channel based on the profile, being further to: compare each of a plurality of stored multimedia content to the profile, identify conforming multimedia content, of the plurality of stored multimedia content, that conforms with the one or more topics of interest to the user and with the channel policy control information, sort the conforming multimedia content based on the user preferences and the channel policy control information, determine respective storage locations associated with the conforming multimedia content, one or more conforming multimedia content, of the conforming multimedia content, being stored at the client device, and other conforming multimedia content, of the conforming multimedia content, being stored externally of the client device, provide, to the client device, a playback list identifying the sorted conforming multimedia content and the respective storage locations, the playback list enabling the client device to provide the sorted conforming multimedia content in an order associated with the sorted conforming multimedia content, provide, to the client device, the other conforming multimedia content before the client device receives a request, from the user, for the custom media channel, and update the playback list based on providing the other conforming multimedia content; receive, from the client device, an indication that the user, when viewing the custom media channel requested another custom media channel; and update the profile based on receiving the indication.

15. The system of claim 14, the one or more processors being further to: identify, based on the profile, advertising content of a plurality of advertising content; include the advertising content in the provided custom media channel.

16. The system of claim 14, where the one or more processors, when comparing each of the plurality of stored multimedia content to the profile, are further to: access metadata relating to the plurality of stored multimedia content; and compare the metadata to the profile.

17. The system of claim 14, where the one or more processors, when providing the playback list, are further to: provide, to the client device, the playback list after receiving the request for the custom media channel, and where the client device is at least one of: a set-top box, a content processing device, a desktop computer, a laptop computer, or a handheld computer.

18. The system of claim 14, where the client device and the one or more server devices are connected via a packet switched network.

19. The system of claim 14, where the one or more processors, when updating the profile, are further to: updating the profile further based on at least one of: an input from the user, or prior selections of multimedia content by the user.

* * * * *